United States Patent
Chou et al.

(10) Patent No.: US 8,366,988 B2
(45) Date of Patent: Feb. 5, 2013

(54) SPUNBOND WETLAID METHOD FOR PRODUCING NON-WOVEN FABRICS FROM NATURAL CELLULOSE

(75) Inventors: Wen-Tung Chou, Changhua County (TW); Ming-Yi Lai, Changhua County (TW); Kun-Shan Huang, Tainan (TW)

(73) Assignee: Acelon Chemical and Fiber Corporation, Changhua County (TW)

( * ) Notice: Subject to any disclaimer, the term of this patent is extended or adjusted under 35 U.S.C. 154(b) by 203 days.

(21) Appl. No.: 12/873,343

(22) Filed: Sep. 1, 2010

(65) Prior Publication Data

US 2011/0156303 A1    Jun. 30, 2011

(30) Foreign Application Priority Data

Dec. 31, 2009 (TW) .............................. 98146658 A

(51) Int. Cl.
     *D01D 5/06*      (2006.01)
     *D01D 5/12*      (2006.01)
     *D01D 10/06*      (2006.01)
     *D01F 2/02*      (2006.01)
     *D04H 3/10*      (2012.01)

(52) U.S. Cl. ............ 264/555; 28/104; 28/107; 264/103; 264/187; 264/203; 264/210.8; 264/211.12; 264/211.14; 264/233; 264/234

(58) Field of Classification Search .................. 264/103, 264/178 F, 187, 203, 210.8, 211.12, 211.16, 264/555, 211.14, 233, 234; 28/107, 104
See application file for complete search history.

(56) References Cited

U.S. PATENT DOCUMENTS

| | | | | |
|---|---|---|---|---|
| 4,107,374 A | * | 8/1978 | Kusunose et al. | 442/400 |
| 4,248,595 A | * | 2/1981 | Lask et al. | 8/181 |
| 6,045,587 A | * | 4/2000 | Cheng et al. | 8/116.1 |
| 6,207,601 B1 | * | 3/2001 | Maurer et al. | 442/333 |
| 6,524,508 B1 | | 2/2003 | Ohnishi et al. | |
| 6,551,705 B1 | | 4/2003 | Ohnishi et al. | |
| 7,153,525 B1 | | 12/2006 | Mumper et al. | |
| 2002/0136848 A1 | * | 9/2002 | Yoshii et al. | 428/35.7 |
| 2002/0148050 A1 | * | 10/2002 | Luo et al. | 8/115.51 |
| 2002/0149131 A1 | * | 10/2002 | Oin et al. | 264/211.12 X |
| 2005/0019564 A1 | * | 1/2005 | Kwon et al. | 428/364 |
| 2005/0079348 A1 | * | 4/2005 | Lee et al. | 264/187 X |
| 2005/0230860 A1 | * | 10/2005 | Bhushan et al. | 264/178 F X |
| 2008/0287025 A1 | * | 11/2008 | Ebeling et al. | 442/400 |
| 2009/0165969 A1 | * | 7/2009 | Luo | 162/76 |
| 2010/0130084 A1 | * | 5/2010 | Matsubara et al. | 264/178 R X |
| 2010/0167018 A1 | * | 7/2010 | Luo et al. | 428/172 |

FOREIGN PATENT DOCUMENTS

WO    WO-2008117805 A1 * 10/2008

* cited by examiner

*Primary Examiner* — Leo B Tentoni
(74) *Attorney, Agent, or Firm* — Bacon & Thomas, PLLC

(57) ABSTRACT

The present invention provides a "spunbond wetlaid method for producing non-woven fabrics from natural cellulose" using pulp as raw material and N-methylmorpholine N-oxide (NMMO) as solvent for dissolving into dope. Then, the dope is extruded out of a spinneret to form filament bundle by spunbond method. The dope is extruded out of a spinneret bank of grouped spinnerets to form filament bundle for further stretching process under quench condition. The filament bundle is coagulated with regeneration in a coagulating solution. The coagulated filament bundle is rapidly stretched under high pressure by an air draw-off machine. The stretched filament bundle is collected and stacked on a collecting net as web nonwoven. After post treatments of water rinsing, hydro-entangled needle punching, drying, winding-up and the like have been orderly applied then final product of nonwoven fabrics with continuous filament are produced from natural cellulose.

16 Claims, 5 Drawing Sheets

SPUNBOND WETLAID METHOD FOR PRODUCING NON-WOVEN FABRICS FROM NATURAL CELLULOSE

FIELD OF THE PRESENT INVENTION

The present invention relates to a "spunbond wetlaid method for producing non-woven fabrics from natural cellulose", particularly for one with environment protective process that not only has advantages in low manufacturing cost without environmental pollution but also features good degree of air permeability and degree of water absorption so that it meet medical and industrial application requirements such as apparels, sanitary and medical materials, filtrating materials, wiping materials for biomedical and optoelectronic wafers and the like.

BACKGROUND OF THE INVENTION

Currently, most nonwoven fabrics of chemical synthetic fiber are produced from melted macromolecule polymers and made by spunlaid process through extrusion and stretch to form continuous filaments as well as stacking laying for web formation so that the nonwoven fabrics of such filaments feature in good physical properties of air permeability and water absorption. Thus, such nonwoven fabrics of chemical synthetic fiber are prevalently used in application fields of medical, sanitary, wiper, filters and so on. According to the survey and statistics of Association of the Nonwoven Fabrics Industry USA (INDA), the marketing share for the nonwoven fabrics of chemical synthetic produced spunlaid process already from 33.5% in 1994 (second) leaps up to 43.7% in 2009 (first) with total annual yield of 2.7 million tons. Wherein, main raw materials are from polypropylene (PP), polyester (PET), polyethylene (PE) and Nylon in quantity order with overall consumed quantity 96%. However, the wasted nonwoven fabric of chemical synthetic fiber after having been used incurs a malignant impact to the environment because they are indissoluble by natural environment. Moreover, for all aforesaid chemical raw materials from petrochemical material, acquiring cost will gradually increased in follow with gradual decrease in mining quantity of petrochemical material, which is not inexhaustible. Nowadays, the manufacturers of the nonwoven fabric gradually divert to use natural materials in substitute for raw materials of chemical synthetic fiber. Nevertheless, only wet-laid method and hydro-entangled needle punching method of long process can be adopted by using such natural materials to produce nonwoven fabric with final product of staple fiber instead of filament in high manufacturing cost so that the degrees of air permeability and water absorption of such nonwoven fabric are decreased. Therefore, how to using suitable natural fiber material with low manufacturing cost to produce nonwoven fabrics with filament instead of staple fiber becomes an urgent and critical issue.

SUMMARY OF THE INVENTION

The primary object of the present invention is to provide a "spunbond wetlaid method for producing non-woven fabrics from natural cellulose" with pulp as raw material and N-methylmorpholine N-oxide (NMMO) as solvent for dissolving into dope. Then, the dope is extruded out of a spinneret to form filament bundle by spunbond method; the dope is extruded out of a spinneret bank of grouped spinnerets to form filament bundle for further stretching process under quench condition; The filament bundle is coagulated with regeneration in a coagulating solution; and the coagulated filament bundle is rapidly stretched under high pressure by an air draw-off machine, then being collected and stacked on a collecting net as web nonwoven; After post treatments of water rinsing, hydro-entangled needle punching, drying, winding-up and the like have been orderly applied then final product of nonwoven fabrics with continuous filament are produced from natural cellulose. Accordingly, the present invention becomes an environment protective process with advantages in low manufacturing cost due to short process and solvent adequately recycle without environmental pollution due to nontoxic N-methylmorpholine N-oxide (NMMO).

The other object of the present invention is to provide a "spunbond wetlaid method for producing non-woven fabrics from natural cellulose" to produce nonwoven fabrics with continuous filament from natural cellulose features better degree of air permeability for nonwoven and degree of water absorption for nonwoven than conventional nonwoven produced either from chemical synthetic fiber or conventional natural fiber so that its waste is biodegradable without any harmful effect in environment.

DETAILED DESCRIPTION OF THE PREFERRED EMBODIMENTS

Figure 1:
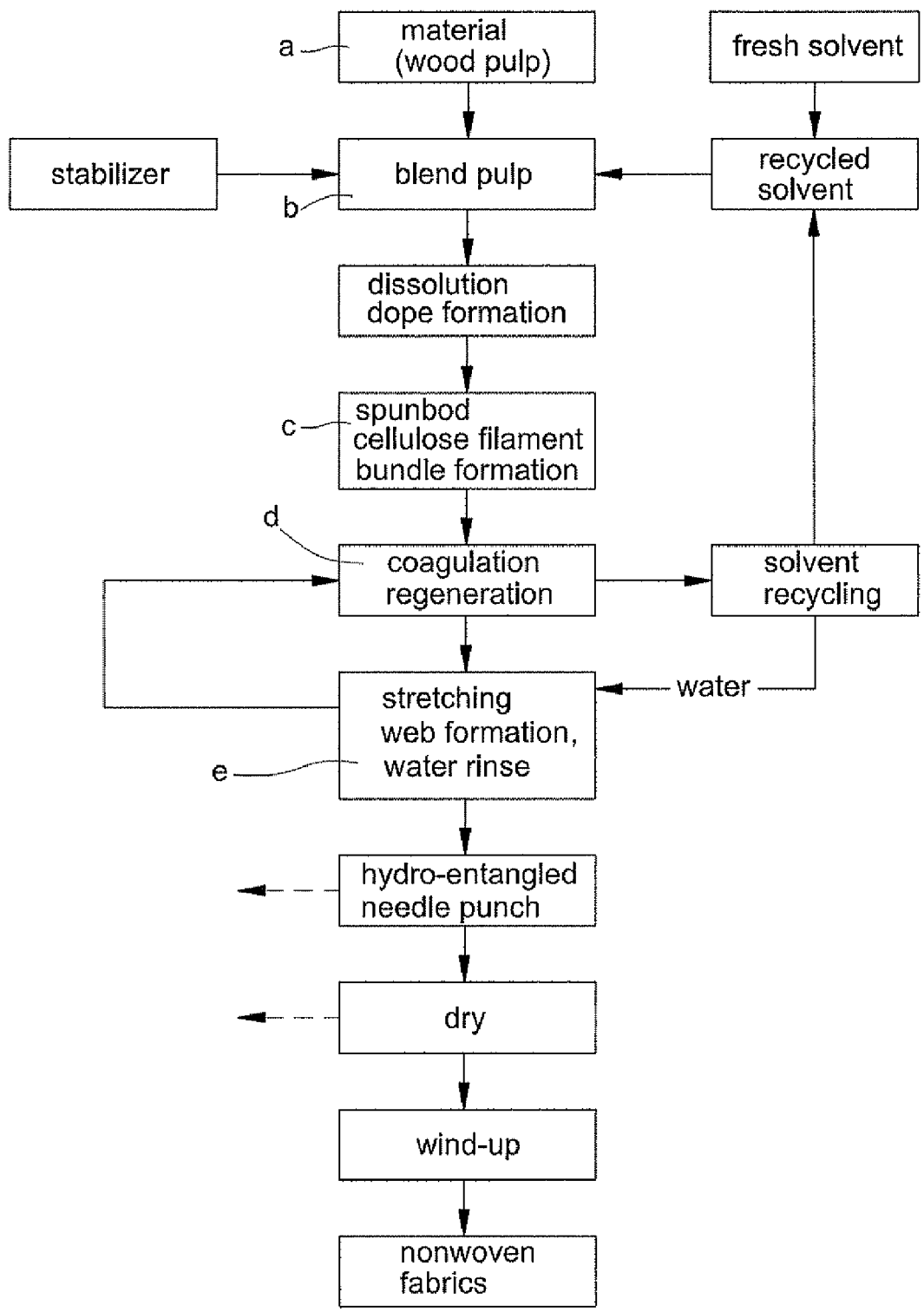
FIG. 1 is a flow chart of block diagram showing the fabricating process of the present invention.
Figure 2:
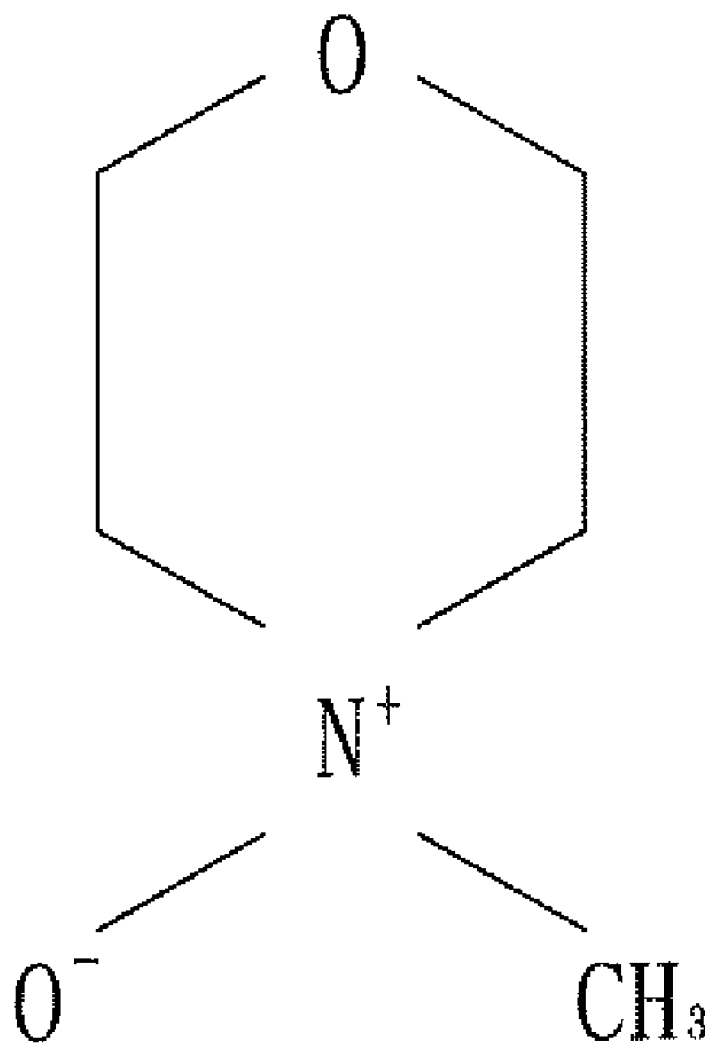
FIG. 2 is a chemical structure of the (N-methylmorpholine N-oxide, called NMMO for short) used in the present invention.
Figure 3:
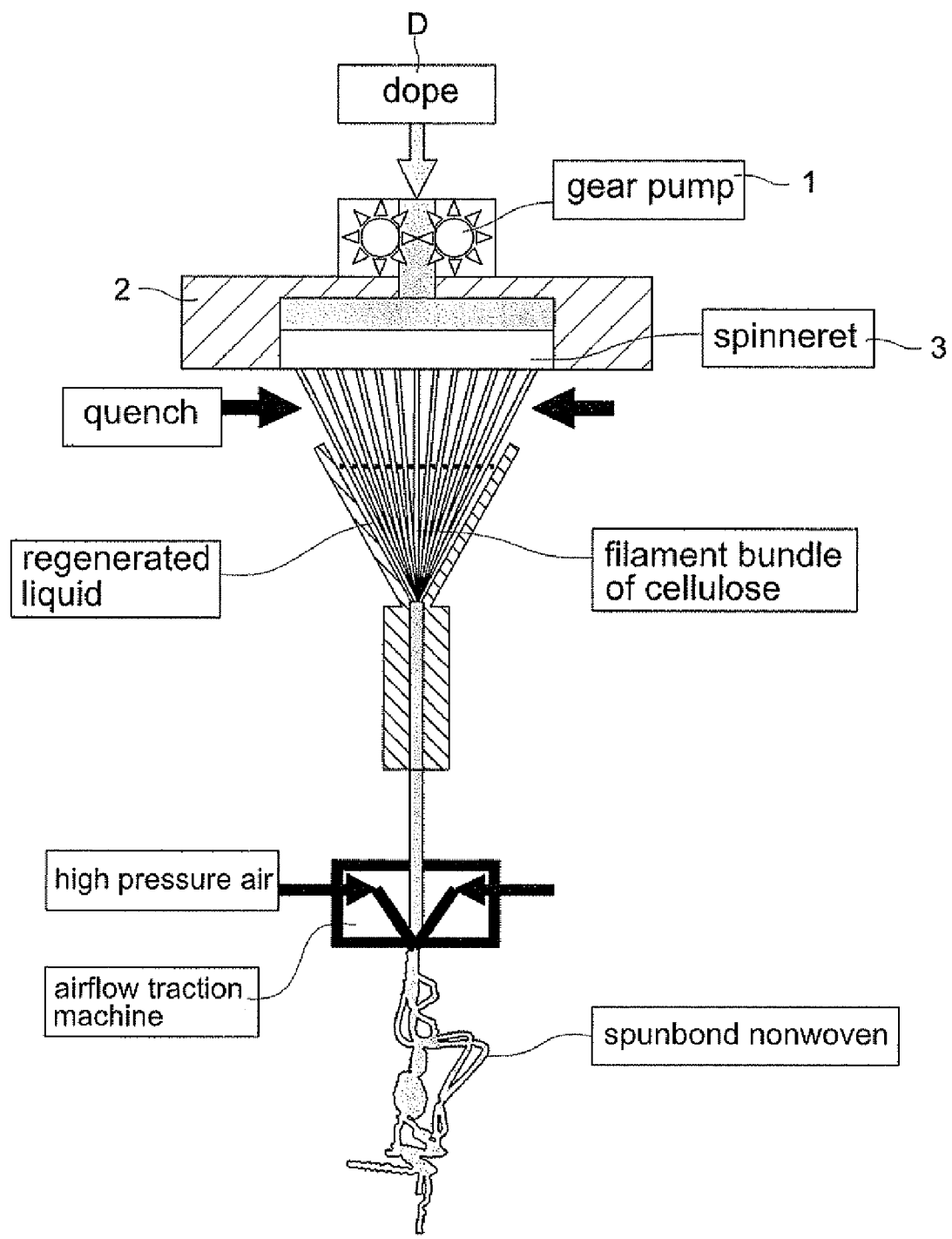
FIG. 3 is an operational schematic view showing a forming process for cellulose spunbond filaments of the present invention.
Figure 4:
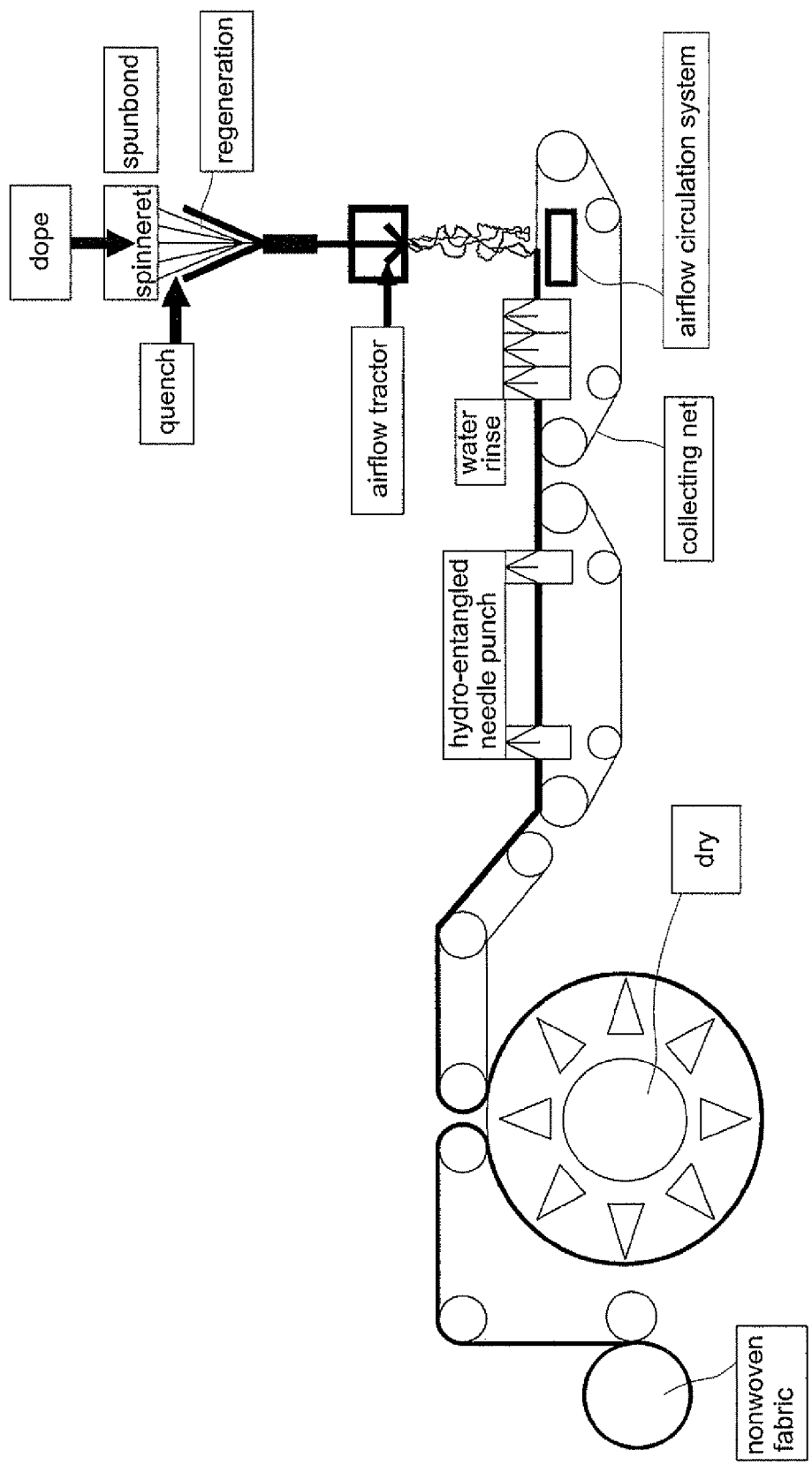
FIG. 4 is a fabrication processing view showing an overall spunbond wetlaid method of the present invention.
Figure 5:
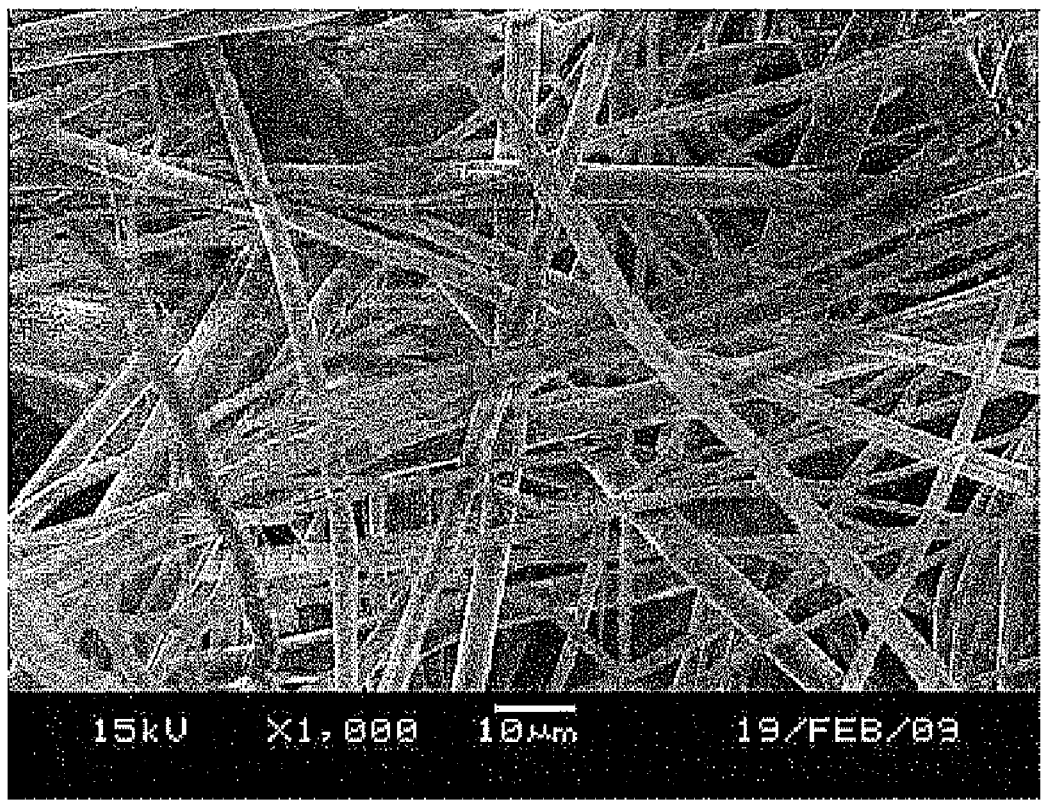
FIG. 5 is an enlarged schematic view with 1000 times of magnification showing a non-woven fabric produced from natural cellulose of the present invention.

For further disclose the fabricating process and efficacy, detailed description for some preferred exemplary embodiments with associated drawings is presented below. Please refer to FIGS. 1 through 5, show processing steps of fabricating method for embodiments of a "spunbond wetlaid method for producing non-woven fabrics from natural cellulose", as follows:

a. Material Selection and Preparation: Select wood pulp as raw material, preferably pulp cellulose of staple or filament with content cellulose being over 65% and degree of polymerization (DP) being between 500~1200;

b. Dope Blending and Dissolution: By putting N-methylmorpholine N-oxide (NMMO) (whose chemical structure as shown in FIG. 2) as dissolving solvent and 1,3-phenylene-bis 2-oxazoline (BOX) as stabilizer into prepared pulp for rapidly grinding, blending and dissolving under low temperature between 60 degree of Celsius and 80 degree of Celsius (60° C.~80° C.) by horizontal dope blending machine by means of cellulose features of high expanding, moistening and dissolving ability as well as high rate of dissolving speed to expedite mutually blending and dissolving effect; Then, dehydrate it via heating up to temperature between 80 degree of Celsius and 120 degree of Celsius (80° C.~120° C.) by vacuum thin film evaporator for 5 minutes to decrease water content thereof down to 5~13% so that a homogenized mucilaginous dope D can be formed;

c. Spunbond and Filament Formation: By spunbond method, the dope D is extruded out of a spinneret bank 3 of grouped spinnerets to form filament bundle for further stretching process under quench condition; As shown in FIG. 3, the dope D is fed into a die assembly 2 by a gear pump 1 and forcedly extruded out the spinneret bank 3 of grouped spinnerets via air gap stretching process under quench condition to form filament bundle, wherein the gap width of the air gap is 2 cm~30 cm while the temperature of quenching air is 5 degrees of Celsius to 30 degrees of Celsius (5° C.~30° C.) with relative humidity thereof being 60%~99%;

d. Filament Coagulation and Regeneration: By means of coagulating solution with concentration of N-methylmorpholine N-oxide (NMMO) being 0~30 wt % under temperature range of 5 degrees of Celsius to 30 degrees of Celsius (5° C.~30° C.), the filament bundle is coagulated with regeneration; and e. Web Formation and Fabric Formation: The coagulated filament bundle is rapidly stretched under high pressure by an air draw-off machine with drawing speed of 20 m/min~3000 m/min, then being collected and stacked on a collecting net as web nonwoven (as shown in FIG. 3); After post treatments of water rinsing, hydro-entangled needle punching, drying, winding-up and the like have been orderly applied (as shown in FIG. 4), then final product of nonwoven fabrics with continuous filament are produced from natural cellulose (as shown in FIG. 5).

Wherein, stabilizer solvent 1,3-phenylene-bis 2-oxazoline (BOX) in above step b functions to subdue the declining recession for the color and degree of polymerization (DP) of cellulose. Whereas, the dissolving solvent N-methylmorpholine N-oxide (NMMO) in above steps b through d is nontoxic so that it can be recycled with low consumption rate via filtration, decolor, and condensation under low pressure distillation after having been drained out in water rinse process with rate of recovery up to over 99.5%. Thereby, it completely complies with the criteria of the environmental protection because it not only can reduce the manufacturing cost but also will not incur any harmful pollution to the environment.

Moreover, for the dope D in above step b, the content percentage of cellulose thereof is 6 wt %~15 wt %, the viscosity thereof is 1000~10000 poise, the light transmittance index thereof is 1.470~1.495, and the melting Index thereof is 100~1000.

Furthermore, for the air draw-off machine in above step e, the drawing speed range thereof is 20 m/min~3000 m/min; And, the wood pulp in above step a can be replaced by paper pulp of staple or filament with content cellulose being over 65%.

For further proving the features and efficacy of the present invention, some exemplary experimental cases having been performed with measured data are described as following.

Firstly, prepare wood pulp cellulose samples 1 through 15 in range for degree of polymerization (DP) being 650~1050 with respective composition of dope as shown in TABLE 1;

Secondly, by putting N-methylmorpholine N-oxide (NMMO) and 1,3-phenylene-bis 2-oxazoline (BOX) into prepared pulp for rapidly blending and dissolving under low temperature between 50 degree of Celsius and 80 degree of Celsius (50° C.~80° C.). Then, dehydrate extra water content therein via heating up to temperature between 80 degree of Celsius and 120 degree of Celsius (80° C.~120° C.) by vacuum thin film evaporator for 10 minutes to decrease water content thereof down to 5~13% so that respective homogenized mucilaginous dope D for each sample is formed;

Thirdly, by spunbond method, each sample dope D is forcedly extruded out of the spinneret bank 3 of grouped spinnerets via air gap stretching process under quench condition to form filament bundle; Then, the filament bundle is coagulated with regeneration in coagulating solution;

Fourthly, the coagulated filament bundle is rapidly stretched under high pressure by an air draw-off machine, then being collected and stacked on a collecting net as web nonwoven; and Finally, after post treatments of water rinsing, hydro-entangled needle punching, drying, winding-up and the like have been orderly applied, then final product of nonwoven fabrics for samples 1 through 15 are produced as shown in TABLE 1.

TABLE 1

Composition of Dope for Samples 1 through 15

| SU | DP nil | MP of ARA wt % | RR for DP % | CP of CL % | CP of SV % | CP of WT % | VC of DP poise | LTI of DP nil | MI of DP nil |
|---|---|---|---|---|---|---|---|---|---|
| 1 | 650 | 0.05% | 26.2 | 10.6 | 81.3 | 8.1 | 2840 | 1.489 | 470 |
| 2 | 650 | 0.10% | 20.5 | 11.5 | 81.9 | 6.6 | 2980 | 1.482 | 420 |
| 3 | 650 | 0.15% | 14.7 | 12.1 | 81.2 | 6.7 | 3240 | 1.486 | 410 |
| 4 | 650 | 0.20% | 11.6 | 11.5 | 82.0 | 6.5 | 3060 | 1.481 | 420 |
| 5 | 650 | 0.25% | 11.3 | 11.2 | 81.8 | 7.0 | 2960 | 1.485 | 430 |
| 6 | 850 | 0.05% | 26.2 | 11.5 | 81.9 | 6.6 | 3840 | 1.489 | 470 |
| 7 | 850 | 0.10% | 20.5 | 12.1 | 81.2 | 6.7 | 3980 | 1.482 | 420 |
| 8 | 850 | 0.15% | 15.9 | 10.5 | 81.1 | 8.4 | 4240 | 1.486 | 410 |
| 9 | 850 | 0.20% | 13.8 | 12.1 | 82.1 | 5.8 | 4560 | 1.480 | 320 |
| 10 | 850 | 0.25% | 12.1 | 11.2 | 82.0 | 6.8 | 4420 | 1.482 | 300 |
| 11 | 1050 | 0.05% | 26.5 | 10.8 | 81.8 | 7.4 | 5240 | 1.481 | 350 |
| 12 | 1050 | 0.10% | 21.7 | 11.5 | 81.1 | 7.4 | 5560 | 1.480 | 320 |
| 13 | 1050 | 0.15% | 15.9 | 12.1 | 82.1 | 5.8 | 5420 | 1.482 | 300 |
| 14 | 1050 | 0.20% | 13.8 | 11.2 | 82.0 | 6.8 | 5280 | 1.476 | 340 |
| 15 | 1050 | 0.25% | 12.1 | 11.9 | 81.0 | 7.1 | 5320 | 1.479 | 310 |

Remark
S = sample
U = unit
DP = degree of polymerization
MP of ARA = mixing percentage of anti-recession additive
RR for DP = rate of recession for degree of polymerization
CP of CL = content percentage of cellulose
CP of SV = content percentage of solvent
CP of WT = content percentage of water
VC of DP = viscosity of dope
LTI of DP = light transmittance index of dope
CP of DP = melting Index of dope Subsequently, perform nonwoven strength test for samples 16 through 30, which are prepared into different basis weights of nonwoven in accordance with respective degree of polymerization (DP) and mixing percentage of anti-recession additive shown in TABLE 1, by criteria of CNS5610 with following procedure.

1. Specimen Preparation:

Respectively obtain 10 pieces of specimens for each cross direction (CD) and mechanical direction or machine direction (MD) with specimen length being over180 mm and specimen width being 2.54 mm.

2. Strength Test:

By using universal strength testing machine with specimen holding jaws of testing fixture being set 76 mm under crosshead speed for extension test being set 300 mm/min, respectively perform test for each of 10 specimens.

3. Testing Results:

Respective nonwoven strength for samples 16 through 30 is listed in following TABLE 2.

TABLE 2

Physical Properties for Samples 16 through 30

| S U | DP nil | MP of ARA wt % | BW of NW g/m² | SMD of NW kgf | SCD of NW kgf | FN of FB μm |
|---|---|---|---|---|---|---|
| 16 | 650 | 0.05% | 100 | 18.1 | 11.3 | 7.2 |
| 17 | 650 | 0.10% | 101 | 19.0 | 11.9 | 6.8 |
| 18 | 650 | 0.15% | 101 | 19.1 | 11.2 | 7.5 |
| 19 | 650 | 0.20% | 99 | 19.0 | 11.0 | 6.5 |
| 20 | 650 | 0.25% | 100 | 18.5 | 11.8 | 7.7 |
| 21 | 850 | 0.05% | 101 | 19.1 | 11.2 | 7.5 |
| 22 | 850 | 0.10% | 99 | 16.0 | 11.0 | 6.5 |
| 23 | 850 | 0.15% | 100 | 18.5 | 11.8 | 7.7 |
| 24 | 850 | 0.20% | 100 | 18.8 | 12.1 | 8.8 |
| 25 | 850 | 0.25% | 99 | 18.2 | 12.0 | 9.2 |
| 26 | 1050 | 0.05% | 101 | 19.8 | 12.8 | 9.5 |
| 27 | 1050 | 0.10% | 100 | 19.2 | 13.1 | 9.8 |
| 28 | 1050 | 0.15% | 99 | 21.7 | 13.4 | 10.2 |
| 29 | 1050 | 0.20% | 99 | 21.2 | 14.5 | 10.9 |
| 30 | 1050 | 0.25% | 100 | 21.1 | 14.5 | 11.2 |

Remark
S = sample
U = unit
DP = degree of polymerization
MP of ARA = mixing percentage of anti-recession additive
BW of NW = basis weight of nonwoven
SMD of NW = strength in machine direction of nonwoven
SCD of NW = strength in cross direction of nonwoven
FN of FB = fineness (or fiber number) of fiber Finally, perform air permeability test and water absorption test for samples 31 through 48, which are prepared in accordance with respective degree of polymerization (DP) and basis weights of nonwoven, by criteria of CNS5612 with following procedure.

1. Air Permeability Test:

Respectively obtain 4 pieces of specimens with specimen dimension being 26×26 cm² for each sample. By using Textest FX 3300 Air Permeability Tester, respectively perform test for each of 18 specimens 31 through 48.

2. Water Absorption Test:

Respectively obtain 5 longitudinal pieces of specimens with specimen width being 76 mm, specimen weight being 5.0±0.1 g and specimen length being determined in accordance with the specimen weight. For testing procedure of water absorption test: firstly, put each specimen in a holding basket, and then dunk the holding basket with specimens in water in totally immersion manner for 10 seconds; secondly, lift the holding basket with specimens out of the water to drip water for 10 seconds; and finally, put the holding basket with specimens into a measuring glass of known weight to measure overall gross weight with 0.1 g precision.

The rate of water absorption for specimen is calculated by following formula:

Rate of Water Absorption (%): $RA_W(\%) = \{[W_A(g) - W_D(g)]/W_D(g)\} \times 100$ Where, $RA_W$ denotes to rate of water absorption for each specimen;

$W_D$ denotes to specimen dry weight before dunking in water; and $W_A$ denotes to specimen wet weight after dunking in water.

3. Testing Results:

Respective nonwoven strength for samples 31 through 48 is listed in following TABLE 3.

TABLE 3

Physical Properties for Samples 31 through 48

| S U | DP nil | BW of NW g/m² | FN of FB μm | DAP for NW cm³/cm²/min | DAP for DWA % |
|---|---|---|---|---|---|
| 31 | 650 | 25 | 4.1 | 2650 | 450 |
| 32 | 650 | 75 | 3.6 | 605 | 520 |
| 33 | 650 | 125 | 4.6 | 219 | 610 |
| 34 | 650 | 175 | 3.4 | 195 | 750 |
| 35 | 650 | 225 | 4.6 | 182 | 920 |
| 36 | 650 | 300 | 4.2 | 145 | 1420 |
| 37 | 850 | 25 | 4.6 | 2650 | 450 |
| 38 | 850 | 75 | 3.4 | 605 | 520 |
| 39 | 850 | 125 | 4.6 | 219 | 610 |
| 40 | 850 | 175 | 5.9 | 211 | 730 |
| 41 | 850 | 225 | 6.2 | 195 | 880 |
| 42 | 850 | 300 | 5.8 | 158 | 1350 |
| 43 | 1050 | 25 | 5.2 | 2870 | 420 |
| 44 | 1050 | 75 | 5.6 | 627 | 550 |
| 45 | 1050 | 125 | 6.0 | 230 | 650 |
| 46 | 1050 | 175 | 5.9 | 211 | 730 |
| 47 | 1050 | 225 | 6.2 | 195 | 880 |
| 48 | 1050 | 300 | 5.8 | 158 | 1350 |

Remark
S = sample
U = unit
DP = degree of polymerization
BW of NW = basis weight of nonwoven
FN of FB = fineness (or fiber number) of fiber
DAP for FB = degree of air permeability for nonwoven
DWA for FB = degree of water absorption for nonwoven As demonstrated by the samples 16 through 30 in TABLE 2 and samples 31 through 48 in TABLE 3, the nonwoven fabric of continuous filament produced from natural cellulose by the present invention features very ideal strength either in mechanical direction (MD) or cross direction (CD) as well as better degree of air permeability for nonwoven and degree of water absorption for nonwoven than conventional nonwoven produced either from chemical synthetic fiber or conventional natural fiber so that it meet medical and industrial application requirements such as apparels, sanitary and medical materials, filtrating materials, wiping materials for biomedical and optoelectronic wafers and the like.

In conclusion of disclosure heretofore, the present invention has advantages in low manufacturing cost due to short process and solvent adequately recycle without environmental pollution due to nontoxic N-methylmorpholine N-oxide (NMMO). Accordingly, we submit the patent application in accordance with related patent laws because the present invention becomes an environment protective process with novelty and practical usage.

What is claimed is:

1. A spunbond wetlaid method for producing a non-woven fabric with continuous filament from natural cellulose, comprising the steps of:
    (a) selecting wood pulp as raw material;
    (b) mixing the wood pulp of step (a) with N-methylmorpholine N-oxide (NMMO) as a dissolving solvent and 1,3-phenylene-bis 2-oxazoline (BOX) as a stabilizer, grinding, blending and dissolving the mixture at a temperature of 50 to 80° C.;
    (c) heating the mixture of step (b) to a temperature of 80 to 120° C. for 10 minutes to decrease the water content thereof down to 5 to 13% to form a homogenized mucilaginous dope;

(d) extruding the homogenized mucilaginous dope out of a spinneret bank of grouped spinnerets by a spunbond method to form a filament bundle;
(e) stretching the filament bundle under quench conditions;
(f) coagulating the filament bundle with regeneration in a coagulating solution;
(g) stretching the filament bundle under high pressure by an air draw-off machine;
(h) collecting the filament bundle on a collecting net to form a nonwoven web; and
(i) water rinsing, hydro-entangled needle punching, drying, and winding-up the nonwoven web to produce the nonwoven fabric with continuous filament.

2. The method of claim 1, wherein the wood pulp is wood pulp cellulose of staple or filament and has a cellulose content of over 65% and a degree of polymerization (DP) of 500 to 1200.

3. The method of claim 1, wherein the concentration of the dissolving solvent N-methylmorpholine N-oxide (NMMO) in the mixture of step (b) is 45% to 75%.

4. The method of claim 1, wherein the homogenized mucilaginous dope of step (c) has a cellulose content of 6 to 15 wt %.

5. The method of claim 1, wherein the homogenized mucilaginous dope of step (c) has a viscosity of 1,000 to 10,000 poise.

6. The method of claim 1, wherein the homogenized mucilaginous dope of step (c) has a light transmittance index of 1.470 to 1.495.

7. The method of claim 1, wherein the homogenized mucilaginous dope of step (c) has a melting index of 100 to 1,000.

8. The method of claim 1, wherein the stretching of step (e) is accomplished via an air gap stretching process; the gap width of the air gap is 2 to 30 cm; and the quenching conditions comprise air at a temperature of 5 to 30 ° C. with a relative humidity of 60 to 99%.

9. The method of claim 1, wherein the coagulating solution of step (f) has a temperature of 5 to 30° C. and a N-methylmorpholine N-oxide (NMMO) concentration of 0 to 30wt %.

10. The method of claim 1, wherein the winding-up in step (i) is at a speed of 2 to 200 meters per minute.

11. The method of claim 1, wherein the nonwoven fabric of step (i) has a natural cellulose basis weight of 10 to 300 g/m$^2$.

12. The method of claim 1, wherein the nonwoven fabric of step (i) has a tensile strength in mechanical direction (MD) of over 20 kgf and a tensile strength in cross direction (CD) of over 12 kgf.

13. The method of claim 1, wherein the nonwoven fabric of step (i) has a fiber fineness of 1 to 15 μm.

14. The method of claim 1, wherein the nonwoven fabric of step (i) has a degree of air permeability of 100 to 3,500 cm$^3$/cm$^2$/min.

15. The method of claim 1, wherein the nonwoven fabric of step (i) has a degree of water absorption of 300 to 2,000%.

16. The method of claim 1, wherein the air draw-off machine of step (g) has a drawing speed of 20 to 3,000 m/min.

* * * * *